(12) United States Patent
Miyazaki

(10) Patent No.: US 7,574,942 B2
(45) Date of Patent: Aug. 18, 2009

(54) CABLE GUIDE FOR AN ARTICULATED JOINT

(75) Inventor: Susumu Miyazaki, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 688 days.

(21) Appl. No.: 10/548,322

(22) PCT Filed: Mar. 29, 2004

(86) PCT No.: PCT/JP2004/004450

§ 371 (c)(1),
(2), (4) Date: Sep. 7, 2005

(87) PCT Pub. No.: WO2004/089581

PCT Pub. Date: Oct. 21, 2004

(65) Prior Publication Data

US 2006/0230862 A1    Oct. 19, 2006

(30) Foreign Application Priority Data

Apr. 1, 2003    (JP) .............................. 2003-097546

(51) Int. Cl.
*F16C 1/10*    (2006.01)
*B25J 17/00*    (2006.01)

(52) U.S. Cl. ................ 74/500.5; 74/490.02; 74/490.01; 901/28; 901/29

(58) Field of Classification Search ............... 74/490.01, 74/490.02, 490.03, 490.04, 490.05, 490.06, 74/500.5, 502.5, 505, 506; 901/15, 19, 28, 901/29, 23, 49, 42; 414/918; 248/276.1, 248/291.1, 597, 593, 283.1, 284.1, 278.1
See application file for complete search history.

(56) References Cited

U.S. PATENT DOCUMENTS 1,644,231 A * 10/1927 Bosworth ................... 248/568

(Continued)

FOREIGN PATENT DOCUMENTS

JP    61-168478    7/1986

(Continued)

OTHER PUBLICATIONS

European Examination Report 04 724 189.8-2316 filed Sep. 24, 2007.

*Primary Examiner*—Marcus Charles
*Assistant Examiner*—Daniel Yabut
(74) *Attorney, Agent, or Firm*—Squire, Sanders & Dempsey L.L.P.

(57) ABSTRACT

To provide an improved cable guide for an articulated joint of a robot or the like that allows a compact design of the articulated joint while minimizing the length of the cable, a substantially circular outer peripheral wall (16) of a hollow center drum (13) fixedly attached to the first link member is formed with a hole (28) at a first angular position substantially aligning with the first link and a slot (17) formed at a second angular position and elongated circumferentially over an angle substantially corresponding to a range of angular movement of the second link member relative to the first link member in such a manner that the cable member is passed into the center drum from the hole and out of the center drum from the slot. Thereby, the cable member can pass through the interior of the articulated joint along the shortest path, and the necessary length of the cable can be minimized.

7 Claims, 3 Drawing Sheets

U.S. PATENT DOCUMENTS 2,395,178 A * 2/1946 Fiori ........................... 248/597
3,030,128 A * 4/1962 Versen ........................ 248/592

FOREIGN PATENT DOCUMENTS

| JP | 61-203587 | 12/1986 |
| JP | 62-79993 | 4/1987 |
| JP | 62-102989 | 5/1987 |
| JP | 63-10089 | 1/1988 |
| JP | 63-10090 | 1/1988 |
| JP | 63-10091 | 1/1988 |
| JP | 63-288692 | 11/1988 |
| JP | 3-109787 | 11/1991 |
| JP | 5-96487 | 4/1993 |
| JP | 5096487 | 4/1993 |

* cited by examiner

CABLE GUIDE FOR AN ARTICULATED JOINT

TECHNICAL FIELD

The present invention relates to a cable guide for guiding a cable member for conducting a signal and/or power in an articulated joint of a robot or the like.

BACKGROUND OF THE INVENTION

In an industrial robot or the like equipped with a multi-joint arm, an electric motor and sensors provided in each of the articulated joints corresponding to the shoulder, elbow and wrist are required to be fed with power and control signals from a control circuit incorporated in the main body of the robot. The cables for conducting the power to the electric motor and the control signals to the sensors extend along the length of the arm, and are typically given with a slack at each of the articulated joints to accommodate for the flexing movement of the articulated joint.

As methods for passing a cable through an articulated joint, it is known to provide a cable passage that bypasses the bearing portion of the articulated joint (as disclosed in Japanese patent laid open publication No. 63-288692) and to use a hollow shaft in the articulated joint to pass the cable therethrough (as disclosed in Japanese patent laid open publication No. 61-168478).

However, according to the technique disclosed in Japanese patent laid open publication No. 63-288692, because the wiring duct for protecting the cable is provided on the exterior of the articulated joint and there is no difference in that the cable extends along the exterior of the articulated joint, an increase in the external dimensions of the articulated joint cannot be avoided.

However, according to the technique disclosed in Japanese patent laid open publication No. 61-168478, because the cable is passed through the inner bore of the hollow shaft, a length of the cable corresponding to the length of the shaft must be spent at the articulated joint so that the total length of the cable becomes relatively large for the given length of the arm and this prevents a compact design of the articulated joint.

BRIEF SUMMARY OF THE INVENTION

In view of such problems of the prior art, a primary object of the present invention is to provide an improved cable guide for-an articulated joint of a robot or the like that allows a compact design of the articulated joint while minimizing the length of the cable.

To achieve such an object, the present invention provides a cable guide for guiding a cable member (27) for conducting a signal and/or power in an articulated joint that connects a first link member (2) and a second link member (2) to each other in a relatively rotatable manner, comprising: a hollow center drum (13) including a substantially circular outer peripheral wall (16) and fixedly attached to the first link member, the outer peripheral wall being provided with a hole (28) formed at a first angular position substantially aligning with the first link and a slot (17) formed at a second angular position and elongated circumferentially over an angle substantially corresponding to a range of angular movement of the second link member relative to the first link member in such a manner that the cable member is passed into the center drum from the hole and out of the center drum from the slot.

Preferably, the cable guide further comprises a substantially annular drum holder (14) coaxially surrounding the center drum and integrally attached to the second link member, the drum holder being provided with a cutout for preventing interference with a part of the cable member extending into the hole of the center drum. Thereby, the cable member can pass through the interior of the articulated joint along the shortest path, and the necessary length of the cable can be minimized.

If the cable guide further comprises a cable support member (21) integrally attached to the center drum and extending inside the center drum to a point adjacent to a center of a rotational movement between the first link member and second link member, the minimum radius of curvature of the cable member can be favorably controlled. If the center drum is provided with an end wall, the cable support member can be integrally formed with the end wall.

If the cable guide further comprises a shutter plate (23L) slidably guided by the center drum for selectively closing the slot, dust and other foreign matter are prevented from getting into the cable support member, and the interior of the cable support member can be concealed from view.

The shutter plate may be actuated by a part of the cable member when opening the slot and by a part of the second link member when closing the slot.

The cable member may be retained by a part of the center drum at a point adjacent to the hole whereby the flexing of the articulated joint would not cause any unstable movement of the cable member.

The first link member and second link member may be relatively rotatably joined to each other on either side the center drum. Thereby, the center drum is entirely received in the articulated joint so that the articulated joint can be designed in a highly compact manner and the center drum is favorably protected. Also, the center drum is protected from excessive forces.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
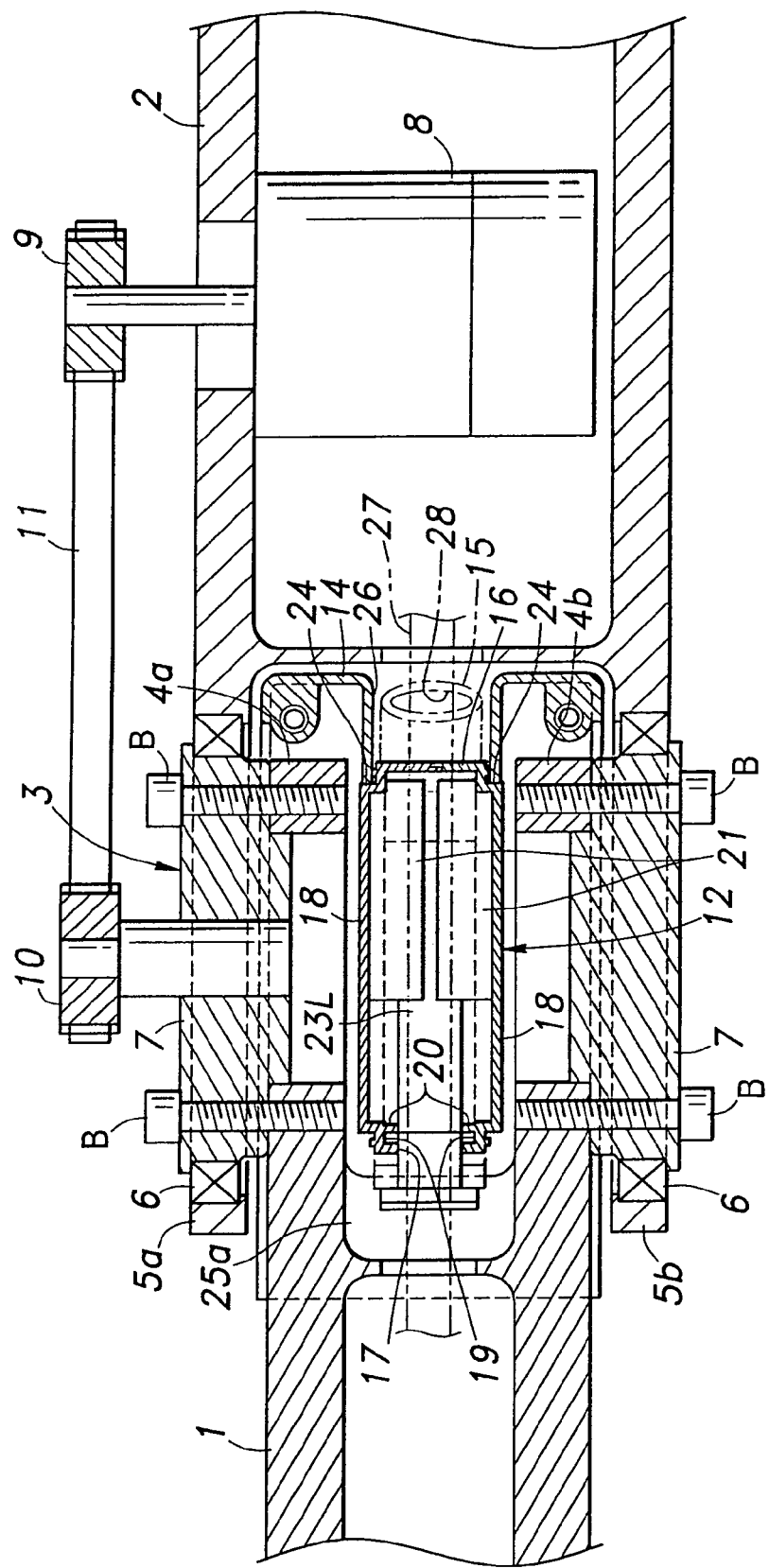
FIG. 1 is a fragmentary sectional side view of a robot arm embodying the present invention taken along line I-I in FIG. 2.
Figure 2:
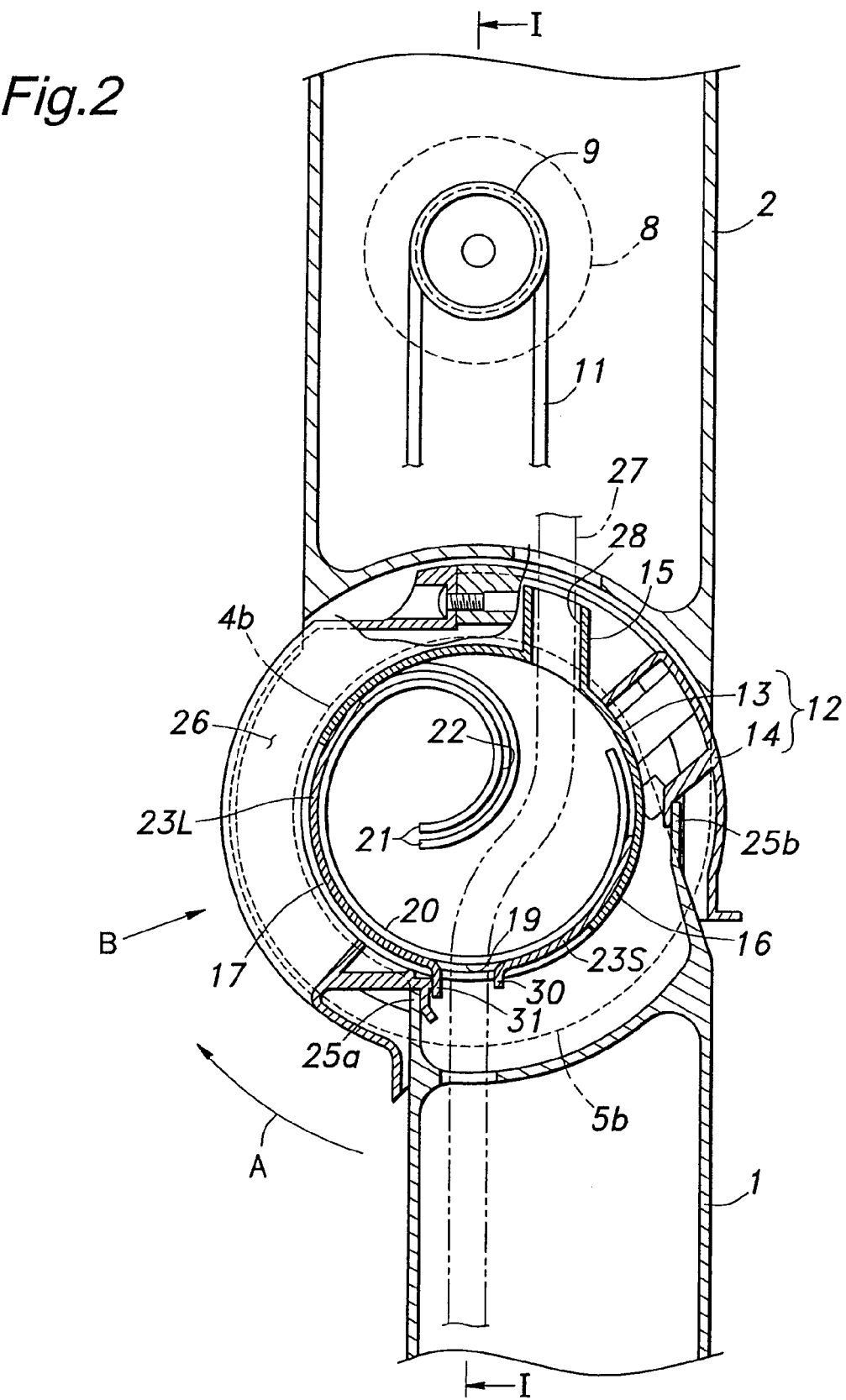
FIG. 2 is a sectional plan view of the articulated joint in a straightened state.

FIGS. 1 and 2 show the outline of the structure of the cable guide for an articulated joint according to the present invention that can be applied to the elbow joint of an arm of an industrial robot or the knee joint of a bipedal robot. The illustrated embodiment is described in the following assuming for the convenience of description that the embodiment is applied to an articulated joint of a revolving arm (first link) which is joined to a fixed arm (second link) so as to be rotatable around a vertical or horizontal axis with respect to the-stationary fixed arm.

The revolving arm 1 is connected to the fixed arm 2 via a knuckle joint 3 in a relatively rotatable manner. The knuckle joint 3 that forms the articulated joint comprises two pairs of extensions 4a, 4b, 5a, 5b, one pair extending from the revolving arm 1 in a mutually spaced relationship along the rotational axial line and the other pair extending from the fixed arm in a similar manner. The pair of extensions 5a, 5b extending from the fixed arm 2 are each fitted with a ball bearing 6. The pair of extensions 4a, 4b extending from the revolving arm 1 are interposed between the pair of extensions 5a, 5b extending from the fixed arm 2. A shaft member 7 is fitted into the inner race of each of the ball bearings 6 fitted to the extensions 5a, 5b of the fixed arm 2, and is fixedly attached to a corresponding one of the extensions 4a, 4b of the revolving arm 1 by using threaded bolts B so that the revolving arm 1 is rotatably supported by the fixed arm 2.

The fixed arm 2 may consist of a tubular member having a rectangular cross section, and an electric motor 8 equipped with a reduction gear is mounted within the fixed arm 2 adjacent to the articulated joint. The output shaft of the electric motor 8 extends out of the fixed arm 2, and the projecting end thereof is fixedly provided with a cogged drive pulley 9. The shaft member 7 fixedly attached to the corresponding extension 4a of the revolving arm 1 is centrally and fixedly provided with a cogged driven pulley 10, and an endless cogged belt 11 is passed around the two cogged pulleys 9 and 10. Thereby, by rotating the electric motor 8 fixedly attached to the fixed arm 2, the shaft members 7 fixedly attached of the extensions 5a, 5b of the fixed arm 2 is made to turn, and the revolving arm 1 integrally connected to the extensions 4a, 4b is made to rotate in a horizontal plane. The reduction gear may be provided on the side of the knuckle joint 3 depending on the need of the design.

Between the extensions 4a, 4b of the revolving arm 1 is interposed a cable guide 12 which includes a center drum 13 and a drum holder 14 that are disposed so as to be rotatable relative to each other.

The center drum 13 consists of a drum-shaped member having a relatively small axial dimension and closed at the both axial ends and substantially around the periphery, and is provided with a funnel-like extension tube 15 extending from a part of the circumferential wall of the center drum 13 and having an axial line extending in a tangential direction. An opposite side of the circumferential wall 16 of the center drum 13 is formed with a slot 17 extending over an angular range (of about half a circumference in the case of the illustrated embodiment) corresponding to the moveable angle between the revolving arm 1 and fixed arm 2.

The inner surface of each of the axial end walls 18 of the center drum 13 is provided with a rib 20 that defines a circumferential groove 19 in cooperation with the outer circumferential wall 16. The circumferential groove 19 and rib 20 extending substantially over the entire circumference except for the part adjacent to the root portion of the extension tube 15. One end of the rib 20 connects to a snail-like portion 21 formed as a spiral rib extending from the inner surface of the outer peripheral wall 16 toward the center, and the corresponding end of the circumferential groove 19 connects to a guide groove 22 formed as a recess in the snail-like portion 21.

The circumferential groove 19 slidably receives a long shutter plate 23L and a short shutter plate 23S which extend from a middle part of the slot 17 in the two opposite directions. The shutter plates 23L, 23S are curved along the circumferential groove 19. In particular, the long shutter plate 23L is made of thin plastic plate which is flexible enough to freely slide into the guide groove 22 having a smaller radius of curvature than the circumferential groove 19.

The outer peripheral part of each axial end wall 18 of the center drum 13 is provided with an annular shoulder 24 which is reduced in diameter from the outer circumferential wall 16. This annular shoulder 24 is engaged the central part of the drum holder 14 over an angular range of more than half the entire circumference so that the center drum 13 can rotate around a certain point by being retained by the drum holder 14.

The drum holder 14 is engaged by engagement pieces 25a, 25b formed at an end of the revolving arm 1 adjacent to the knuckle joint and is thereby integrally joined to the revolving arm 1. The drum holder 14 is provided with a clearance groove 26 in an axially middle part thereof over an angular range of about half the entire circumference to stay clear from the extension tube 15 of the center drum 13.

A cable 27 is drawn from the fixed arm 2 into the center drum 13. The cable 27 is passed into a circular opening 28 of the extension tube 15 that faces the fixed arm 2, and extends along the outer circumferential surface of the snail-like portion 21 in the center drum 13. The cable 27 further extends through a gap defined between the ends 30, 31 of the two shutter plates 23L, 23S opposing each other in the middle part of the slot 17, and then into the revolving arm 1, which consists of a tubular member having a rectangular cross section similarly as the fixed arm 2.

When the knuckle joint 3 is flexed in the direction indicated by arrow A in FIG. 2 by actuating the electric motor 8, the cable 27 is allowed to curve by being guided by the outer circumferential surface of the snail-like portion 27. Because the part of the cable 27 that has been introduced into the circular opening 28 of the extension tube 15 is substantially immobile in a same way as the fixed arm 2, the center drum 13 which is engaged by the part of the cable 27 extending in the fixed arm 2 by way of the circular opening 28 of the extension tube 15 is therefore integral with the fixed arm 2, and remains immobile at all times. On the other hand, the drum holder 14 that is engaged by the revolving arm 1 rotates integrally with the revolving arm 1.

The part of the cable 27 extending in the revolving arm 1 is secured to appropriate parts of the revolving arm 1, for instance by using saddle members so as to maintain a fixed relationship to the revolving arm 1. Therefore, as the revolving arm 1 rotates, the cable 27 therein moves in the direction indicated by arrow A in FIG. 2, and at the same time pushes the end portion 31 of the long shutter plate 23L. As a result, the long shutter plate 23L moves into the guide groove 22 formed in the snail-like portion 21 in continuation with the circumferential groove 19, and progressively opens the surface of the slot 17 opposing the end portion of the revolving arm 1. At this time, the short shutter plate 23S on the opposite side maintains a fixed relationship with the circumferential groove 19 until the flexing angle reaches a certain value.

In this manner, the cable 27 can freely bend over the angular range defined by the slot 17 formed in the outer circumferential wall 16 of the center drum 13. Owing to the clearance groove 26 formed in the axially middle part of the drum holder 14, the extension tube 15 would not interfere with the rotational movement of the drum holder 14.

Figure 3:
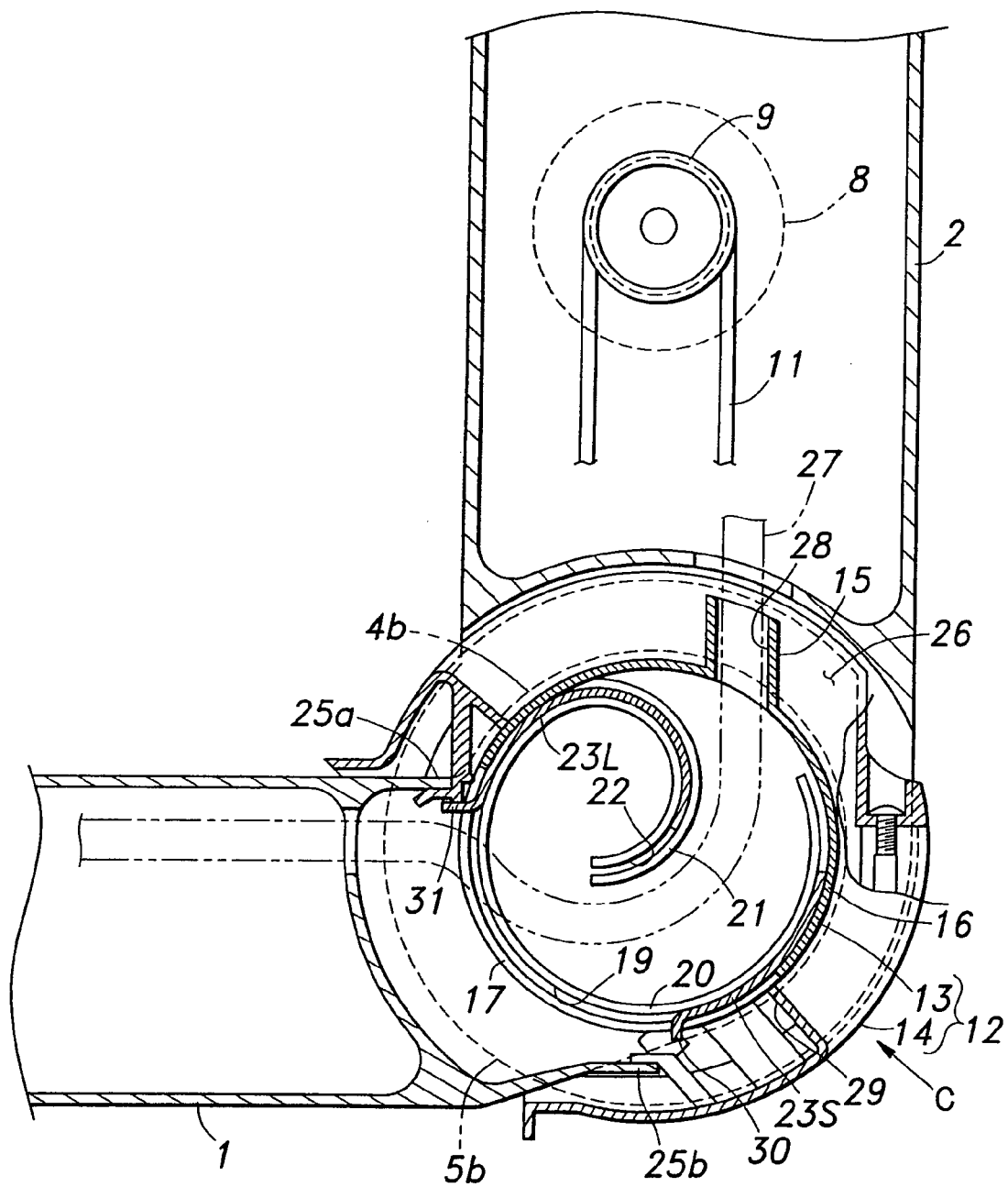
FIG. 3 is a sectional plan view of the articulated joint in a flexed state.

When the revolving arm 1 has rotated by about 90 degrees, a large part of the clearance groove 26 of the drum holder 14 is received in the space defined between the two extensions 5a, 5b of the fixed arm 2 so that only the outer circumferential wall 16 of the center drum 13 is visible from the exterior of the knuckle joint 3 (in the direction indicated by arrow C in FIG. 3). The part of the cable 27 extending inside the center drum 13 curves along the outer circumferential surface of the snail-like portion 21, and the minimum radius of curvature is determined by the curvature of radius of the snail-like portion 21 so that the cable 27 is prevented from being bent at an undesirably sharp angle. Furthermore, because the long shutter plate 23L is inside the guide groove 22 of the snail-like portion 21, the long shutter plate 23L would not interfere with the cable 27 drawn into the center drum 13.

When the revolving arm 1 is flexed even further from the state illustrated in FIG. 3, one of the circumferential walls 29 of the clearance groove 26 engages the corresponding end portion 30 of the short shutter plate 23S and closes the slot 17 so that the interior of the center drum 13 is prevented from becoming visible between the clearance grooves 26 from the direction indicated by arrow C in FIG. 3.

When the revolving arm 1 is straightened, one of the engagement pieces 25a of the revolving arm 1 engaging the drum holder 14 pushes the end portion 31 of the long shutter plate 23L and closes the slot 17. When the knuckle joint 3 is straightened, the slot 17 is completely closed by the long shutter plate 23L. Thereby, dust and other foreign matter are prevented from getting into the center drum 13, and the interior of the center drum 13 is prevented from becoming visible between the clearance grooves 26 from the direction indicated by arrow B in FIG. 2.

The cable guide of the present invention described above is equally applicable to other articulated joints such as shoulders and wrists. The relationship between the revolving arm 1 and fixed arm 2 is only relative, and the present invention can also be implemented in a reversed relationship. As for the relationship between each arm 1, 2 and cable 27, as long as one of the arms and cable move in a substantially integral manner, it is possible to allow a relative rotation between the center drum 13 and drum holder 14 without any problem. The present invention is applicable not only to guide electric cables as described above but also to guide flexible tubes for supplying hydraulic and pneumatic media.

INDUSTRIAL APPLICABILITY

As can be appreciated from the foregoing description, according to the present invention, the dimensions of the part of an articulated joint for passing a cable can be minimized, and the weight of the robot can be reduced while the loss of power transmission can be reduced at the same time. Furthermore, because the cable is favorably concealed, not only the external appearance can be enhanced but also the cable is protected from damages. In particular, because the curvature of the cable at the time of flexing the articulated joint is controlled, the damage to the cable due to repeated bending can be minimized, and the reliability of the robot can be improved. Furthermore, because the relative rotation between the center drum and drum holder is effected without causing any excessive bending of the cable, the need for a powered actuator is eliminated while the structure is simplified at the same time.

Although the present invention has been described in terms of a preferred embodiment thereof, it is obvious to a person skilled in the art that various alterations and modifications are possible without departing from the scope of the present invention which is set forth in the appended claims.

The invention claimed is:

1. A cable guide for guiding a cable member for conducting a signal and/or power in an articulated joint that connects a first link member and a second link member to each other in a relatively rotatable manner, comprising:
a hollow center drum including a substantially circular outer peripheral wall and fixedly attached to the first link member, the outer peripheral wall being provided with a hole formed at a first angular position substantially aligning with the first link and a slot formed at a second angular position and elongated circumferentially over an angle substantially corresponding to a range of angular movement of the second link member relative to the first link member in such a manner that the cable member is passed into the center drum from the hole and out of the center drum from the slot;
a cable support member integrally attached to the center drum and extending inside the center drum to a point adjacent to a center of a rotational movement between the first link member and second link member, wherein the center drum is provided with an end wall, and the cable support member is integrally formed as a rib extending from the end wall; and
a shutter plate slidably and circumferentially guided by the center drum and having an end circumferentially interposed between an engagement piece fixedly attached to the second link and the cable member such that the shutter plate is actuated in either circumferential direction depending on a direction of an angular movement of the second link relative to the first link.

2. The cable guide according to claim 1, further comprising a substantially annular drum holder coaxially surrounding the center drum and integrally attached to the second link member, the drum holder being provided with a cutout for preventing interference with a part of the cable member extending into the hole of the center drum.

3. The cable guide according to claim 1, wherein the center drum is provided with a pair of end walls, and a cable support member formed by a pair of ribs extending from the two end walls toward each other.

4. The cable guide according to claim 1, wherein the cable member is retained by a part of the center drum at a point adjacent to the hole.

5. The cable guide according to claim 1, wherein the first link member and second link member are relatively rotatably joined to each other on either side the center drum.

6. The cable guide according to claim 1, further comprising a rib that defines a circumferential guide groove for circumferentially guiding the shutter plate in cooperation with an outer circumferential wall of the center drum.

7. The cable guide according to claim 1, wherein the rib forming the cable guide member includes a first spiral rib extending from an inner surface of an outer peripheral wall of the center drum toward a center of the center drum and forming a snail-like portion jointly with a second spiral rib extending in parallel with the first spiral rib, a guide groove for guiding the shutter plate being defined between the first and second spiral ribs.

* * * * *